(12) United States Patent
Haun et al.

(10) Patent No.: US 6,837,326 B2
(45) Date of Patent: Jan. 4, 2005

(54) TRACTOR GRILLE AND GRILLE GUARD

(75) Inventors: Robert Dale Haun, Evans, GA (US); David Laverne Sprinkle, Warrenton, GA (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/042,072

(22) Filed: Oct. 19, 2001

(65) Prior Publication Data

US 2003/0075370 A1 Apr. 24, 2003

(51) Int. Cl.$^7$ .............................................. B60K 11/04
(52) U.S. Cl. ...................... 180/68.6; 280/770; 293/115
(58) Field of Search ..................... 180/68.6; 293/115, 293/142, 143, 144; 280/770, 762; 296/193.09, 193.1

(56) References Cited

U.S. PATENT DOCUMENTS

| | | | |
|---|---|---|---|
| 2,492,410 A | * 12/1949 | Arps | 280/500 |
| 2,537,553 A | * 1/1951 | Schonauer | 280/491.1 |
| 3,622,174 A | * 11/1971 | Wakeen et al. | 280/760 |
| 3,815,701 A | * 6/1974 | Mayhew | 180/69.21 |
| 3,949,889 A | 4/1976 | Moe | |
| 4,099,760 A | 7/1978 | Mascotte et al. | |
| 4,269,428 A | 5/1981 | Rexine | |
| 4,288,490 A | * 9/1981 | Alfter et al. | 428/314.8 |
| 4,641,870 A | 2/1987 | Heyman | |
| 4,681,302 A | * 7/1987 | Thompson | 256/13.1 |
| 5,277,465 A | 1/1994 | Weir | |
| 5,636,885 A | 6/1997 | Hummel | |
| 5,695,228 A | 12/1997 | Storer | |
| 5,941,329 A | 8/1999 | Ichioka et al. | |
| 6,041,878 A | * 3/2000 | Daniels et al. | 180/68.6 |
| 6,082,477 A | * 7/2000 | Murakawa | 180/69.21 |
| 6,152,504 A | 11/2000 | Dickson et al. | |
| 6,155,580 A | * 12/2000 | Symons | 280/33.991 |
| 6,206,122 B1 | * 3/2001 | Boothman et al. | 180/89.17 |
| 6,290,271 B1 | * 9/2001 | Geisler | 293/115 |
| 6,318,773 B2 | * 11/2001 | Storer | 293/115 |
| 6,416,847 B1 | * 7/2002 | Lein et al. | 428/209 |
| 6,460,916 B2 | * 10/2002 | Mizuta | 296/183 |

OTHER PUBLICATIONS

Brochure: "John Deere 5000 TEN Series Tractors 45 to 65 PTO—Horsepower," 20 pgs.

* cited by examiner

Primary Examiner—Christopher P. Ellis
Assistant Examiner—Christopher Bottorff
(74) Attorney, Agent, or Firm—The Law Office of Randall T. Erickson, P.C.

(57) ABSTRACT

In a tractor having a frame, a grille has a hollow frame fastened to a front portion of the frame of the tractor, so as to protect a radiator of the tractor. Two brackets are provided, each of which is mounted to the front portion of the frame of the tractor and each of which projects frontwardly from the frame of the tractor, through an aperture in a lower portion of the frame of the grille. A guard is provided, which is fastened to the brackets, in front of the grille, so as to protect the grille. The hollow frame of the grille is fastened to the front portion of the frame of the tractor only at the lower portion of the frame of the grille. The hollow frame of the grille is molded, as by rotational molding, from a polymeric material, for which cross-linked polyethylene is preferred. The brackets and the guard are made of steel.

25 Claims, 3 Drawing Sheets

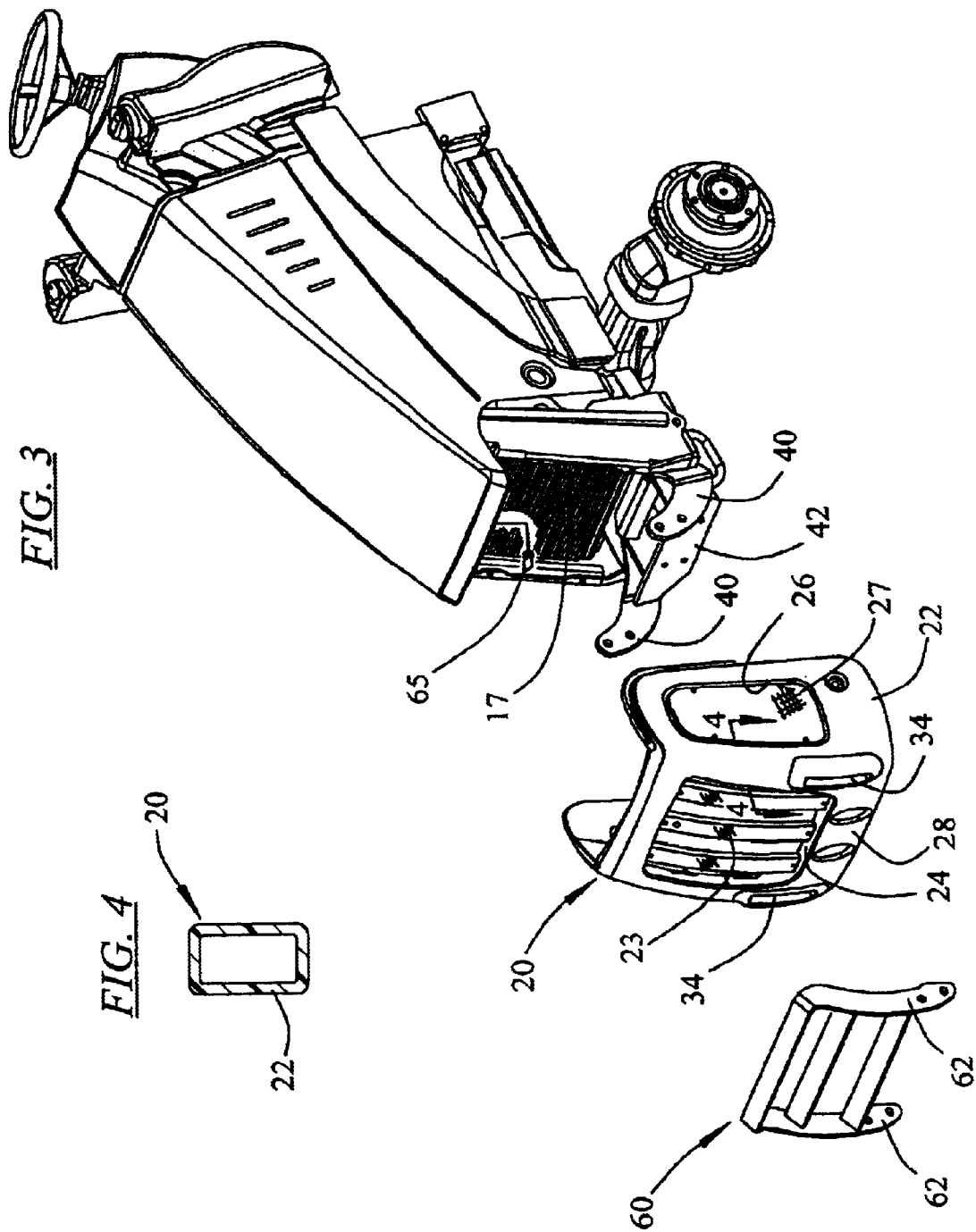

TRACTOR GRILLE AND GRILLE GUARD

TECHNICAL FIELD OF THE INVENTION

This invention pertains generally to a tractor, such as a tractor equipped with a loader having a bucket, and particularly to a grille for the tractor and to a grille guard.

BACKGROUND OF THE INVENTION

When a tractor is equipped with a loader having a bucket, debris falling from the bucket can damage the cooling system of the tractor unless the tractor is equipped with a grille, which protects the cooling system of the tractor. Sometimes, debris falling from the bucket can damage the grille, unless the tractor also is equipped with a guard for the grille.

In a tractor equipped with a loader having a bucket, the radiator and engine compartment of the tractor should allow the operator to have good lines of sight to the top and sides of the bucket and should allow ground and loader clearances that are adequate. If provided, a grille to protect the radiator and a guard to protect the grille should not interfere with such lines of sight and should not reduce ground or loader clearances.

Prior grilles and grille guards for tractors are exemplified in U.S. Pat. No. 3,622,174 and U.S. Pat. No. 3,949,889.

SUMMARY OF THE INVENTION

According to a first aspect of this invention, a tractor having a frame, which has a front portion, is provided with a grille having a hollow frame. The hollow frame of the grille has a lower portion. The grille is fastened to the front portion of the frame of a tractor only at the lower portion of the hollow frame of the grille.

Preferably, the frame of the grille is molded, as by rotational molding, from a polymeric material, for which cross-linked polyethylene is preferred. Preferably, the hollow frame is a three-sided, three-dimensional space frame, each side of which is formed by hollow frame members.

According to a second aspect of this invention, a combination of a grille, a bracket, and a grille guard is provided in a tractor having a frame, which has a front portion. The grille has a frame fastened to the front portion of the frame of the tractor. The bracket is mounted, as by welding, to the front portion of the frame of the tractor. The bracket projects frontwardly, through an aperture in the frame of the grille. The grille guard is fastened to the bracket, in front of the grille.

Preferably, the aperture, through which the bracket projects, is located in a lower portion of the frame of the grille. Preferably, the bracket is one of a pair of brackets, each of which is employed similarly.

Preferably, in a combination according to the second aspect of this invention, a grille according to the first aspect of this invention is employed, along with a grille guard, as described above.

These and other objects, features, and advantages of this invention are evident from the following description of a preferred embodiment of this invention, with reference to the accompanying drawings.

BRIEF DESCRIPTION OF THE DRAWINGS

FIG. 3 is a fragmentary, exploded, perspective view, which is similar in many respects to FIG. 2, except that the grille also is separated.

FIG. 4, on an enlarged scale, is a cross-sectional detail taken along line 4—4 in FIG. 3, in a direction indicated by arrows.

DETAILED DESCRIPTION OF THE PREFERRED EMBODIMENT

Figure 1:
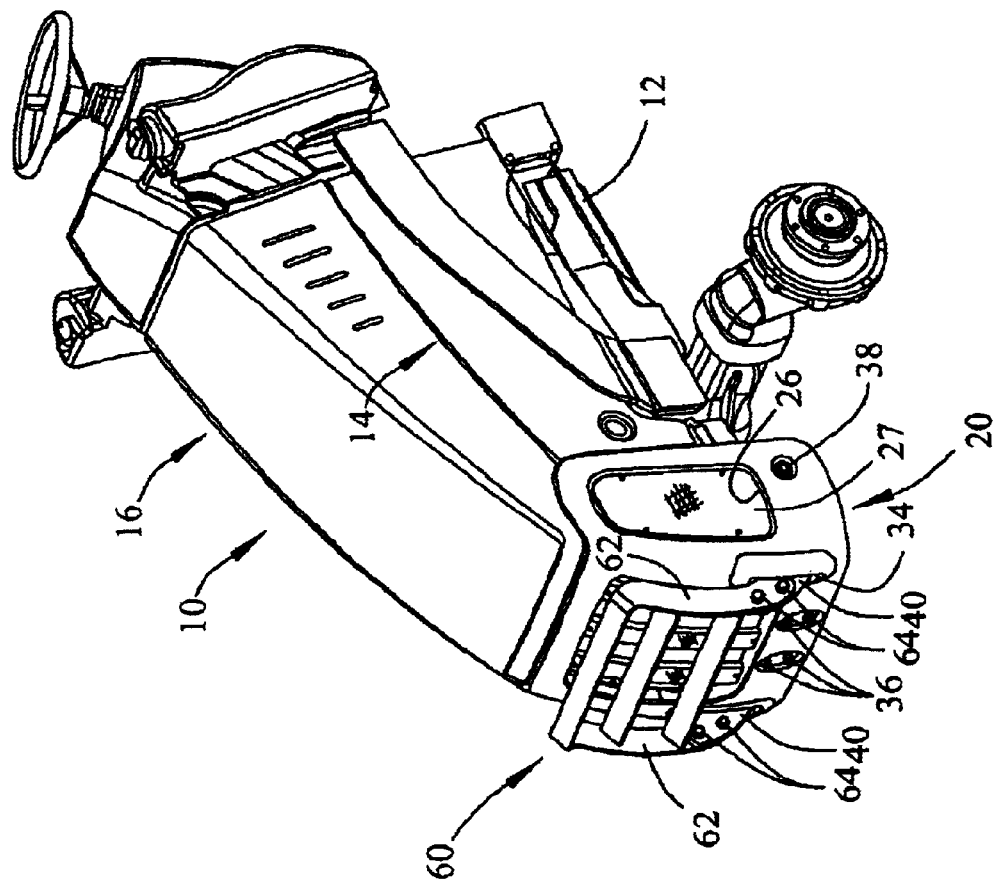
FIG. 1 is a fragmentary, perspective view of a front portion of a tractor equipped with a novel combination of a grille having a hollow frame, a pair of brackets, and a grille guard. Being outside the scope of this invention, other elements of the tractor are not shown.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

Figure 2:
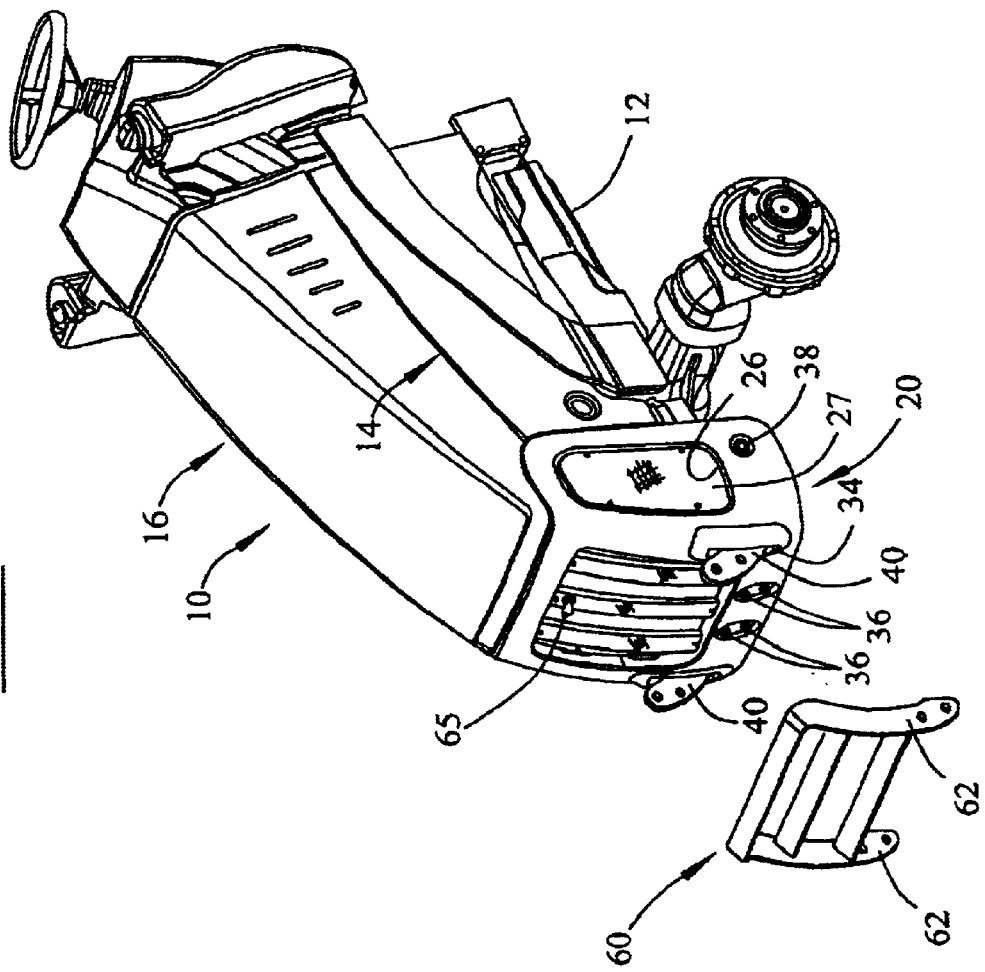
FIG. 2 is a fragmentary, exploded, perspective view, which is similar in many respects to FIG. 1, except that the grille guard is separated.

As shown in FIGS. 1–3, a tractor 10 having a steel frame 12, an engine compartment 14 mounted onto the steel frame 12, and a hood 16 hinged to the engine compartment 14 at a rear portion of the hood 16 is equipped with a novel combination of a grille 20, a pair of brackets 40, and a grille guard 60. The engine compartment 14 and the hood 16 enclose a cooling system 17 (shown in FIG. 3) of the tractor 10.

The grille 20 has a hollow frame 22, which is molded, preferably by rotational molding, from cross-linked polyethylene, which is a tough, impact-resistant material, so as to have a front window 24 and two side windows 26. The grille 20 has a corrugated wire mesh screen 23 that is mounted, via fasteners, in the front window 24. Wire mesh screens 27 are mounted, via fasteners, in the side windows 26. The hollow frame 22 has lower apertures (not shown) venting the frame 22.

The hollow frame 22 is a three-sided, three-dimensional, space frame, each side of which is formed by hollow frame members (see FIG. 4 for a cross-sectional detail of one such member), which communicate internally with one another so as to enhance resiliency of the hollow frame 22. The hollow frame 22 is molded so as to have two apertures 34, each being elongate in a vertical sense, one on each side of the front window 24, and each extending through a lower portion 28 of the hollow frame 22.

The grille 20 is mounted to a front portion 42 of the frame 12 of the tractor 10, only at the lower portion 28 of the frame 22, via fasteners 36 beneath the front window 24 and via a fastener 38 beneath each of the side windows 26. Being molded from cross-linked polyethylene and being vented, the hollow frame 22 is resilient but has sufficient rigidity to enable the hollow frame 22 to support the grille 20, even though the grille 20 is mounted only at the lower portion 28 of the hollow frame 22.

The brackets 40, which are hook-shaped pieces of sheet steel, are welded, as shown, or mounted by fasteners (not shown) or otherwise to the front portion of the steel frame 12 of the tractor 10 so as to project frontwardly and upwardly. Each bracket 40 projects through one of the apertures 34 of the frame 22 of the grille 20. The grille guard 60, which is disposed in front of the grille 20 is welded from sheet steel so as to have two depending legs 62, each of which fits alongside and is fastened, via fasteners 64, to one of the brackets 40.

A hood release actuator 65, shown in FIGS. 2 and 3, penetrates an opening in the screen 23 and is exposed for grasping and pulling from between bars of the grille guard 60.

The grille 20 protects the cooling system of the tractor 10 and the grille guard 60 protects the grille 20. Also, if the tractor 10 is equipped with a loader (not shown) having a bucket, the grille 20 and the grille guard 60 do not interfere with the operator's lines of sight to the top and sides of the bucket and do not reduce ground or loader clearances.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. In a tractor having a tractor frame, which has a front portion, a grille having a grille frame, which is defined by hollow frame members, including hollow vertical members, the grille frame having a lower portion, which is fastened to the front portion of the tractor frame only at the lower portion of the grille frame.

2. The grille of claim 1, in which the grille frame is molded from a polymeric material.

3. The grille of claim 2, in which the polymeric material is cross-linked polyethylene.

4. In a tractor having a tractor frame, which has a front portion, a combination comprising a grille, which has a grille frame fastened to the front portion of the tractor frame, the grille frame comprising hollow frame members that define a substantially rectangular front open area, a bracket, which is mounted to the front portion of the tractor frame and which projects frontwardly from the front portion of the tractor frame, through an aperture in one of the hollow frame members of the grille frame, and a guard, which is fastened to the bracket, in front of the grille.

5. The combination of claim 4, wherein the grille frame has a lower portion which is fastened to the front portion of the tractor frame only at the lower portion of the grille frame.

6. The combination of claim 5, in which the aperture is located in the lower portion of the grille frame.

7. The combination of claim 4, in which the grille frame is molded from a polymeric material.

8. The combination of claim 7, in which the polymeric material is cross-linked polyethylene.

9. In a tractor having a tractor frame, which has a front portion, a combination comprising a grille, which has a grille frame fastened to the front portion of the tractor frame, wherein the grille frame comprises a three-dimensional space frame, which is formed by hollow frame members, a pair of brackets, each of which is mounted to the front portion of the tractor frame and each of which projects frontwardly, through an aperture in a hollow member of the grille frame, and a guard, which is fastened to the brackets, in front of the grille.

10. The combination of claim 9, wherein the grille frame has a lower portion which is fastened to the front portion of the tractor frame only at the lower portion of the grille frame.

11. The combination of claim 10, in which the apertures are located in the lower portion of the grille frame.

12. The combination of claim 9, in which the grille frame is molded from a polymeric material.

13. The combination of claim 12, in which the polymeric material is cross-linked polyethylene.

14. In a tractor having a tractor frame, which has a front portion, a grille having a grille frame, which is hollow, which has a lower portion, and which is fastened to the front portion of the tractor frame only at the lower portion of the grille frame;

wherein the grille frame comprises a structure having three sides, each side comprising a substantially rectangular subframe, each substantially rectangular subframe defining an open central region, each subframe formed by hollow frame members.

15. In a tractor having a tractor frame, which has a front portion, a grille having a grille frame, which is hollow, which has a lower portion, and which is fastened to the front portion of the tractor frame only at the lower portion of the grille frame;

wherein the grille frame comprises a three-dimensional space frame, which is formed by hollow frame members, said space frame defining front and side open areas between adjacent vertical ones of said hollow frame members.

16. The grille of claim 14, in which the grille frame is molded from a polymeric material.

17. The grille of claim 16, in which the polymeric material is cross-linked polyethylene.

18. The grille of claim 15, in which the grille frame is molded from a polymeric material.

19. The grille of claim 18, in which the polymeric material is cross-linked polyethylene.

20. In a tractor having a tractor frame, a radiator carried by the tractor frame, and a grille mounted in front of the radiator, the grille having a grille frame with front frame members surrounding a front-facing opening that is substantially covered by an air permeable front wall, the improvement comprising:

said front frame members comprising horizontal and vertical tubular members connected together to be substantially closed and to substantially retain air therein, said tubular members composed of plastic.

21. The improvement according to claim 20, wherein said tubular members have rectangular cross sections.

22. The improvement according to claim 20, wherein said plastic is composed of cross-linked polyethylene.

23. In a tractor having a tractor frame, a radiator carried by the tractor frame, and a grille mounted in front of the radiator, the grille having a grille frame with front frame members surrounding a front-facing opening that is substantially covered by an air permeable front wall, the improvement comprising:

said front frame members comprising tubular members connected together to be substantially closed and to substantially retain air therein, said tubular members composed of plastic; and wherein said frame further includes hollow right side frame members at least partially defining a right side opening, and hollow left side frame members at least partially defining a left side opening, said right side opening and said left side opening each substantially covered by an air permeable side wall, said front frame members, said right side frame members, said left side members, said front wall and said side walls together defining a three dimensional structure, said side walls each substantially perpendicular to said front wall.

24. The improvement according to claim 23, wherein said grille frame is mounted to said tractor frame only by fasteners extending through bottom members of said front frame members and bottom members of said left and right side frame members.

25. The improvement according to claim 20, wherein said grille frame is mounted to said tractor frame only along a bottom region thereof.

* * * * *